(12) United States Patent
Ishikawa et al.

(10) Patent No.: US 11,664,508 B2
(45) Date of Patent: May 30, 2023

(54) FUEL CELL SYSTEM AND METHOD OF CONTROLLING FUEL CELL SYSTEM

(71) Applicant: TOYOTA JIDOSHA KABUSHIKI KAISHA, Toyota (JP)

(72) Inventors: Tomotaka Ishikawa, Nagoya (JP); Satoshi Watanabe, Okazaki (JP); Kazushi Akamatsu, Anjo (JP)

(73) Assignee: TOYOTA IDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 17/507,011

(22) Filed: Oct. 21, 2021

(65) Prior Publication Data

US 2022/0200019 A1 Jun. 23, 2022

(30) Foreign Application Priority Data

Dec. 22, 2020 (JP) .............................. JP2020-211987

(51) Int. Cl.
*H01M 8/04029* (2016.01)
*H01M 8/04007* (2016.01)
*H01M 8/0258* (2016.01)
*H01M 8/0267* (2016.01)

(52) U.S. Cl.
CPC ..... *H01M 8/04029* (2013.01); *H01M 8/0258* (2013.01); *H01M 8/0267* (2013.01); *H01M 8/04067* (2013.01)

(58) Field of Classification Search
CPC ........... H01M 8/04029; H01M 8/0258; H01M 8/0267; H01M 8/04067; H01M 8/04074; H01M 8/04228; H01M 8/04253; H01M 8/04225; H01M 8/04268; H01M 8/04302
See application file for complete search history.

(56) References Cited

U.S. PATENT DOCUMENTS

| 11,024,860 B2 * | 6/2021 | Riley ................ H01M 8/04358 |
| 2005/0064257 A1 * | 3/2005 | Isoda .................. H01M 8/0267 |
| | | 429/469 |
| 2005/0175874 A1 * | 8/2005 | Alessi ................ H01M 8/0267 |
| | | 429/429 |

FOREIGN PATENT DOCUMENTS

| JP | 2002141096 A | 5/2002 |
| JP | 2005093349 A | 4/2005 |
| JP | 2009004243 A | 1/2009 |

* cited by examiner

*Primary Examiner* — Stewart A Fraser
(74) *Attorney, Agent, or Firm* — Dickinson Wright, PLLC (57) ABSTRACT

A fuel cell system includes a plurality of fuel cell units each including a fuel cell, a fuel cell cooling system having a heat exchanger that exchanges heat between a primary-side coolant, and a secondary-side coolant flowing through the fuel cell, and a coolant pump that adjusts the flow rate of the secondary-side coolant, and a controller that controls the fuel cell, a cooling device, and a cooling system that supplies the primary-side coolant from the cooling device to each fuel cell unit. During stop of operation of the fuel cell system, the cooling device supplies the primary-side coolant having a temperature equal to or higher than a predetermined temperature to each fuel cell unit, and the controller activates the coolant pump to cause the secondary-side coolant to flow through the heat exchanger, in one or more fuel cell units in which the fuel cell has a possibility of freezing.

4 Claims, 7 Drawing Sheets

FUEL CELL SYSTEM AND METHOD OF CONTROLLING FUEL CELL SYSTEM

CROSS-REFERENCE TO RELATED APPLICATION

This application claims priority to Japanese Patent Application No. 2020-211987 filed on Dec. 22, 2020, incorporated herein by reference in its entirety.

BACKGROUND

1. Technical Field

The disclosure relates to a fuel cell system and a method of controlling the fuel cell system.

2. Description of Related Art

In a fuel cell system, warm-up operation to increase heat generated by a fuel cell during power generation of the fuel cell is performed, so as to improve the reliability in starting of the system at lower temperatures below the freezing point, for example, so that the temperature of the fuel cell is raised in a shorter time than that during normal operation (see, for example, Japanese Unexamined Patent Application Publication No. 2009-4243 (JP 2009-4243 A)).

SUMMARY

However, in the warm-up operation using heat generated by the fuel cell, the heat source is only the fuel cell itself; therefore, it takes time for the temperature of the fuel cell to be raised to a proper temperature. In particular, where a plurality of fuel cells is used as an emergency power generator, quick supply of electric power is requested at the start of the use, and it is desirable to reduce the time required for the warm-up operation before the generator can be used.

This disclosure can be practiced in the following forms.

(1) According to one form of the disclosure, a fuel cell system is provided. The fuel cell system includes a plurality of fuel cell units each including a fuel cell, a fuel cell cooling system having a heat exchanger that performs heat exchange between a primary-side coolant supplied from an outside, and a secondary-side coolant that flows through the fuel cell, and a coolant pump that adjusts a flow rate of the secondary-side coolant, and a controller that controls operation of the fuel cell, a cooling device, and a cooling system that supplies the primary-side coolant from the cooling device to each of the fuel cell units. During stop of operation of the fuel cell system, the cooling device is configured to adjust a temperature of the primary-side coolant to a level that is equal to or higher than a predetermined temperature, and supply the primary-side coolant to each of the fuel cell units, and the controller is configured to activate the coolant pump to cause the secondary-side coolant to flow through the heat exchanger, in at least one of the fuel cell units in which the fuel cell has a possibility of freezing. According to the fuel cell system of this form, during stop of operation of the fuel cell system, the coolant pump is activated at least in the fuel cell unit or units each having the fuel cell having a possibility of freezing, so that the secondary-side coolant warmed by receiving heat via the heat exchanger from the primary-side coolant set to a temperature at which it does not freeze flows through the fuel cell, to warm the fuel cell. Thus, freezing of the fuel cell can be avoided. As a result, the warm-up time at the start of the fuel cell system can be shortened.

(2) In the fuel cell system of the above form (1), the fuel cell cooling system may further have a valve operable to selectively cause the secondary-side coolant flowing from the fuel cell to flow through the heat exchanger or bypass the heat exchanger. During stop of operation of the fuel cell system, the controller of each of the at least one of the fuel cell units in which the fuel cell has the possibility of freezing may be configured to activate the coolant pump, and operate the valve to cause the secondary-side coolant to flow through the heat exchanger. According to the fuel cell system of this form, during stop of operation of the fuel cell system, the coolant pump is activated, and the valve is operated to cause the secondary-side coolant to flow through the heat exchanger, at least in the fuel cell unit or units each having the fuel cell having the possibility of freezing, so that the secondary-side coolant warmed by receiving heat via the heat exchanger from the primary-side coolant set to the temperature at which it does not freeze flows through the fuel cell, to warm the fuel cell. Thus, freezing of the fuel cell can be avoided. As a result, the warm-up time at the start of the fuel cell system can be shortened.

(3) In the fuel cell system of the above form (2), in each of at least one of the fuel cell units that starts operating during operation of the fuel cell system, while a temperature of the secondary-side coolant used as a temperature of the fuel cell is lower than a target temperature, the controller may be configured to activate the coolant pump, and operate the valve to cause the secondary-side coolant to flow through the heat exchanger, when the temperature of the secondary-side coolant is lower than a temperature of the primary-side coolant, and the controller may be configured to activate the coolant pump, and operate the valve to cause the secondary-side coolant to bypass the heat exchanger, when the temperature of the secondary-side coolant is equal to or higher than the temperature of the primary-side coolant. According to the fuel cell system of this form, in each fuel cell unit that has started operating, out of the fuel unit cells, while the temperature of the secondary-side coolant is lower than the target temperature, the fuel cell can be warmed by the secondary-side coolant that is warmed by receiving heat via the heat exchanger from the primary-side coolant and flows through the fuel cell, when the temperature of the secondary-side coolant is lower than that of the primary-side coolant, and the fuel cell can also be warmed through self-heating caused by operation of the fuel cell.

(4) The fuel cell system of any one of the above forms (1) to (3) may further include a unit controller that controls the fuel cell units. The unit controller may be configured to determine that the fuel cell has the possibility of freezing when an ambient temperature of the fuel cell of which the possibility of freezing is to be determined is equal to or lower than a freezing determination temperature. According to the fuel cell system of this form, the unit controller determines whether the fuel cell has the possibility of freezing, based on the ambient temperatures of the fuel cell concerned, so that the possibility of freezing of the fuel cell can be determined with improved accuracy.

(5) In the fuel cell system of any one of the above forms (1) to (3), the controller of each of the fuel cell units may be configured to determine that the fuel cell has the possibility of freezing when an ambient temperature of the fuel cell of which the possibility of freezing is to be determined is equal to or lower than a freezing determination temperature. According to the fuel cell system of this form, the controller determines whether the fuel cell has the possibility of freezing, based on the ambient temperatures of the fuel cell concerned, so that the possibility of freezing of the fuel cell concerned can be determined with improved accuracy.

This disclosure may also be practiced in various forms other than those as described above, and may be practiced in the form of a method of controlling a fuel cell system, or a power generation apparatus including a fuel cell system, for example.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment

Figure 1:
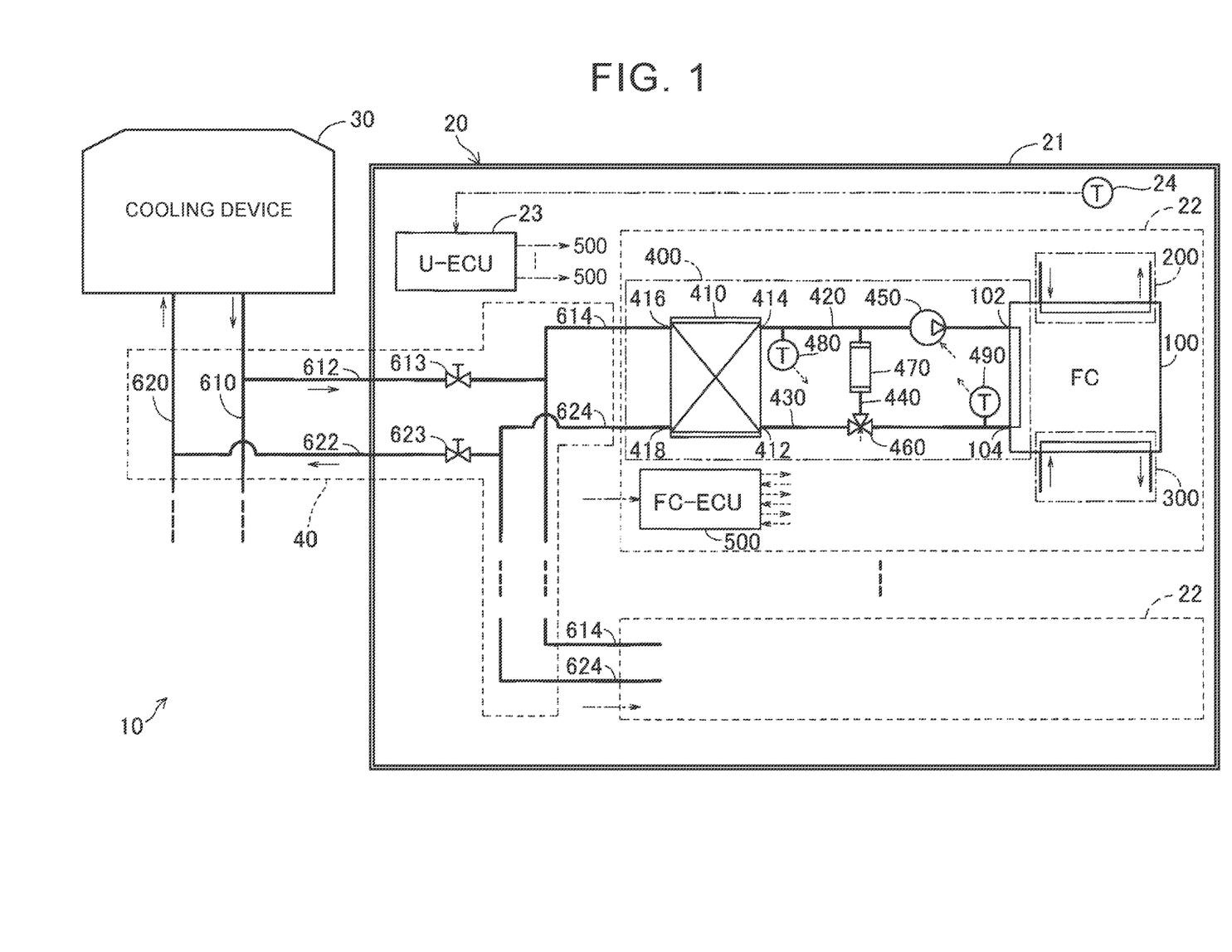
FIG. 1 is an explanatory view schematically showing the configuration of a fuel cell system as a first embodiment.

FIG. 1 schematically shows the configuration of a fuel cell system 10 as a first embodiment. The fuel cell system 10 is a stationary power generation system using fuel cells, and includes a power generating facility 20 using the fuel cells, a cooling device 30 provided outside the power generating facility 20, and a cooling system 40 that supplies coolant for cooling from the cooling device 30 into the power generating facility 20. The power generating facility 20 has a plurality of fuel cell units 22 and a unit controller 23 (labelled as "U-ECU 23" in FIG. 1) housed in a container 21 installed in place. In operation, the power generating facility 20 supplies electric power to the outside when at least one of the fuel cell units 22 generates electric power under control of the unit controller 23. The cooling device 30 supplies by circulation the coolant for cooling to each of the fuel cell units 22 in the power generating facility 20, via the cooling system 40. In this connection, the container 21 is not necessarily an essential constituent element, but the power generating facility 20 may not include the container 21.

The cooling system 40 includes a main supply line 610 connected to the cooling device 30, a facility supply line 612 connected to the main supply line 610, and a plurality of primary-side coolant supply lines 614 that connect the facility supply line 612 to heat exchangers 410, respectively, included in the fuel cell units 22 that will be described later. The cooling system 40 also includes a main reflux line 620 connected to the cooling device 30, a facility reflux line 622 connected to the main reflux line 620, and a plurality of primary-side coolant reflux lines 624 that connect the facility reflux line 622 to the heat exchangers 410, respectively, included in the fuel cell units 22. Each of the primary-side coolant supply lines 614 is connected to a primary-side inlet 416 of the corresponding heat exchanger 410, and each of the primary-side coolant reflux lines 624 is connected to a primary-side outlet 418 of the corresponding heat exchanger 410. A partition valve 613 is provided in the facility supply line 612, and a partition valve 623 is provided in the facility reflux line 622. The partition valves 613, 623 are normally placed in open states, such that the coolant can flow through the lines 612, 622.

With the cooling device 30 and the heat exchanger 410 of each fuel cell unit 22 thus connected by the cooling system 40, the coolant supplied from the cooling device 30 to the primary-side inlet 416 of the heat exchanger 410 via the cooling system 40 flows through the heat exchanger 410, and is discharged from the primary-side outlet 418 of the heat exchanger 410, to return to the cooling device 30 via the cooling system 40. The cooling device 30 cools the coolant returned via the cooling system 40, using latent heat of vaporization, and uses it as coolant for cooling again, so that the coolant for cooling can be supplied by circulation.

While operation of the fuel cell system 10 is stopped, namely, while power generation by the power generating facility 20 is stopped, the cooling device 30 performs temperature control for making the coolant temperature equal to higher than a given temperature at which the coolant does not freeze, and circulates the coolant, so as to prevent freezing of the cooling device 30 and the cooling system 40. Since water is generally used as the coolant, the given temperature at which the coolant does not freeze is set in advance to a temperature that is higher than the freezing point (0° C.) of water. For example, the given temperature may be set to any temperature within the range of about 5° C. to 15° C., and may be set to a temperature around 10° C., for example. In this connection, the temperature control of the coolant and circulation of the coolant are not necessarily performed all the time, but the temperature control and the circulation control may be performed when the coolant temperature becomes lower than a predetermined temperature, and there is a possibility of freezing of the coolant.

All of the fuel cell units 22 of the power generating facility 20 basically have the same configuration. In FIG. 1, the configuration of only one fuel cell unit 22 is specifically illustrated, and those of the other fuel cell units 22 are not illustrated.

The fuel cell unit 22 is a unit that generates electric power by reacting fuel gas and oxidant gas as reaction gases, and includes a fuel cell 100 (labelled as "FC 100" in FIG. 1), fuel gas supply system 200, oxidant gas supply system 300, fuel cell cooling system 400, and fuel cell controller 500 (labelled as "FC-ECU 500" in FIG. 1).

The fuel cell 100 has a stack structure that consists of a plurality of cells (which will also be called "unit cells") as unit modules of power generation, which are stacked together. Each unit cell is a polymer electrolyte fuel cell that generates electric power using fuel gas and oxidant gas. In this embodiment, hydrogen is used as the fuel gas, and oxygen in the air is used as the oxidant gas. In each unit cell, an anode-side gas channel through which the fuel gas flows is formed on the anode side, and a cathode-side gas channel through which the oxidant gas flows is formed on the cathode side, such that an electrolyte membrane is interposed between the anode-side gas channel and the cathode-side gas channel. Also, between each pair of adjacent unit cells, a coolant channel is formed through which the coolant for cooling the unit cells on the opposite sides flows. The fuel cell is not limited to the polymer electrolyte fuel cell, but other types of fuel cells, such as a solid oxide fuel cell, may be employed.

The fuel gas supply system 200 supplies the fuel gas to the fuel cell 100, and supplies by circulation fuel off-gas discharged from the fuel cell 100 as fuel gas. The oxidant gas supply system 300 supplies the oxidant gas to the fuel cell 100, and discharges oxidant off-gas from the fuel cell 100. The supply of the fuel gas in the fuel gas supply system 200, and the supply of the oxidant gas in the oxidant gas supply system 300, are controlled by the fuel cell controller 500 that controls various actuators included in the fuel gas supply system 200 and oxidant gas supply system 300, respectively.

The fuel cell cooling system 400 is a coolant circulation system that supplies by circulation the coolant to the fuel cell 100, so as to adjust the temperature of the fuel cell 100. As the coolant, an antifreeze solution, such as ethylene glycol, or water, or a mixture of an antifreeze solution and water, or the like, is used.

The fuel cell cooling system 400 includes the heat exchanger 410, a coolant supply line 420 that connects a secondary-side outlet 414 of the heat exchanger 410 with a coolant inlet 102 of the fuel cell 100, a coolant pump 450 provided in the coolant supply line 420, and a coolant reflux line 430 that connects a coolant outlet 104 of the fuel cell 100 with a secondary-side inlet 412 of the heat exchanger 410. A flow dividing valve 460 is provided in the coolant reflux line 430, and a bypass line 440 is connected to the coolant reflux line 430 via the flow dividing valve 460. The bypass line 440 is connected to the coolant supply line 420, to join the line 420 at a position between the heat exchanger 410 and the coolant pump 450. The bypass line 440 is provided with an ion exchanger 470 having an ion exchange resin for removing ions contained in the coolant flowing therethrough.

The flow dividing valve 460 is capable of changing the ratio of the coolant flowing via the secondary side of the heat exchanger 410, to the coolant bypassing the heat exchanger 410 and flowing through the bypass line 440. In this embodiment, the flow dividing valve 460 is in the form of a rotary valve. The flow dividing valve 460 corresponds to the above-mentioned "valve" capable of selectively causing the coolant flowing out of the fuel cell 100 to flow through the heat exchanger or bypassing the heat exchanger.

The primary-side coolant supply line 614 of the cooling system 40 is connected to the primary-side inlet 416 of the heat exchanger 410, and the primary-side coolant reflux line 624 is connected to the primary-side outlet 418 of the heat exchanger 410. Through the primary side of the heat exchanger 410, the coolant supplied from the cooling device 30 flows.

The heat exchanger 410 performs heat exchange between the coolant (which will also be called "primary-side coolant") flowing through the primary side, and the coolant (which will also be called "secondary-side coolant") flowing through the secondary side. For example, the primary-side coolant cooled by the cooling device 30 receives heat from the secondary-side coolant, and lowers the temperature of the secondary-side coolant, to thus cool the secondary-side coolant.

A temperature sensor 480 that measures the temperature of the secondary-side coolant flowing from the heat exchanger 410 is provided, in an end portion of the coolant supply line 420 closer to the heat exchanger 410. Also, a temperature sensor 490 that measures the temperature of the secondary-side coolant flowing from the fuel cell 100 is provided, in an end portion of the coolant reflux line 430 closer to the fuel cell 100. Measurement values of the temperature sensors 480, 490 are transmitted to the fuel cell controller 500, and are used for temperature control of the secondary-side coolant in the fuel cell cooling system 400.

The operating state of the fuel cell cooling system 400, namely, the operating state of the coolant pump 450 and the flow dividing valve 460, is controlled by the fuel cell controller 500. For example, in the fuel cell unit 22 in which electric power is generated through operation of the fuel cell system 10, the fuel cell cooling system 400 is generally operated in the following manner.

When the temperature of the fuel cell 100 is equal to or higher than a target temperature, the opening of the flow dividing valve 460 in a direction toward the heat exchanger 410 and the drive amount of the coolant pump 450 are adjusted, so that the secondary coolant flows into the heat exchanger 410, and the secondary coolant cooled in the heat exchanger 410 is supplied by circulation to the fuel cell 100. Normally, the opening of the flow dividing valve 460 in the direction toward the heat exchanger 410 is controlled to the degree corresponding to the fully open position. In this case, the fuel cell 100 can be cooled, so that the fuel cell 100 can generate power, in a condition where the temperature of the fuel cell 100 is equal to or higher than the target temperature, and is also a proper temperature suitable for power generation.

When the temperature of the fuel cell 100 is lower than the target temperature, the flow dividing valve 460 is fully opened in a direction toward the bypass line 440, and the drive amount of the coolant pump 450 is adjusted, so that the entire amount of the secondary-side coolant flowing through the fuel cell 100 is caused to flow through the bypass line 440, and the secondary-side coolant that has bypassed the heat exchanger 410 is supplied by circulation to the fuel cell 100. In this case, the temperature of the secondary-side coolant is raised by self-heating through power generation of the fuel cell 100, and the fuel cell 100 can be warmed up so that the temperature of the fuel cell 100 becomes equal to or higher than the target temperature.

In the fuel cell unit 22 in which operation is stopped and power generation is not performed, operation of the fuel cell cooling system 400 is in a stopped state, except for the case that will be described later.

The fuel cell controller 500 is provided by a computer, such as a microcomputer, including a central processing unit (CPU), memories, such as a read-only memory (ROM) and a random access memory (RAM), and an input-output port. The fuel cell controller 500 of the fuel cell unit 22 in which power is generated by operation of the fuel cell system 10 executes various control programs stored in a memory, obtains information from various meters (not shown), and various sensors including the temperature sensors 480, 490, and controls the fuel gas supply system 200, oxidant gas supply system 300, and fuel cell cooling system 400. Also, when the fuel cell system 10 is in an operation stopped state, namely, when each fuel cell unit 22 of the power generating facility 20 is in an operation stopped state, the fuel cell controller 500 of each fuel cell unit 22 executes a control program for the operation stopped state stored in the memory, so as to control operation of the fuel cell cooling system 400. The control of the fuel cell controller 500 in the operation stopped state of the fuel cell unit 22 will be described later. The fuel cell controller 500 is not necessarily provided by a single controller, but may consist of two or more controllers, such that necessary information is sent and received between the controllers.

In the container 21 of the power generating facility 20, a temperature sensor 24 that measures the ambient temperature of the fuel cell units 22 housed in the container 21 is provided. Measurement values of the temperature sensor 24 are transmitted to the unit controller 23, and used for control of the fuel cell controller 500 of each fuel cell unit 22 that will be described later. In the following description, the ambient temperature of the fuel cell units 22 housed in the container 21 will be simply called "ambient temperature in the container 21" when appropriate.

The unit controller 23 is provided by a computer, such as a microcomputer, including a CPU, memories, such as a ROM and a RAM, and an input-output port. The unit controller 23 of the power generating facility 20 in which power is generated by operation of the fuel cell system 10 executes various control programs stored in a memory, and controls operation of each fuel cell unit 22, by giving a command to the fuel cell controller 500 of each fuel cell unit 22. Also, when the fuel cell system 10 is in the operation stopped state, the unit controller 23 executes a control program for the operation stopped state stored in the memory, obtains information from the temperature sensor 24, and controls operation of the fuel cell cooling system 400 of each fuel cell unit 22, by giving a command to the fuel cell controller 500 of each fuel cell unit 22. The control of the unit controller 23 in the operation stopped state of the fuel cell system 10 will be described later. The unit controller 23 is not necessarily provided by a single controller, but may consist of two or more controllers, such that necessary information is sent and received between the controllers.

Figure 2:
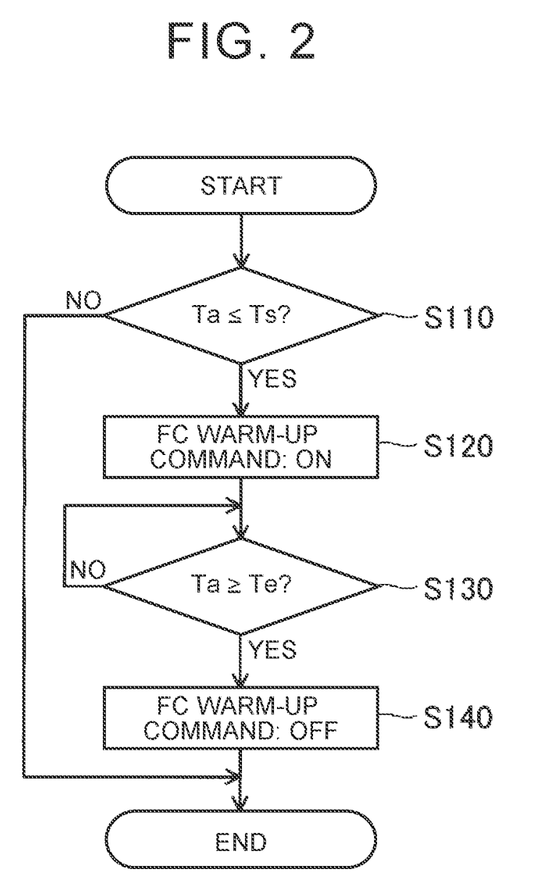
FIG. 2 is a control flowchart of a unit controller in an operation stopped state of the fuel cell system.

FIG. 2 is a control flowchart of the unit controller 23 in the operation stopped state of the fuel cell system. In step S110, the unit controller 23 obtains the ambient temperature Ta in the container 21, from the temperature sensor 24, and determines whether there is a possibility of freezing of the fuel cell 100 of each fuel cell unit 22, from the relationship between the ambient temperature Ta and a warm-up start threshold temperature Ts.

The warm-up start threshold temperature Ts is set to a temperature at which there is a possibility of freezing of the fuel cell 100, more specifically, liquid water inside the fuel cell 100 is freezing or may freeze, and is determined so as to melt the liquid water that is frozen, or prevent the liquid water having a possibility of freezing from freezing. For example, the warm-up start threshold temperature Ts is set to a temperature equal to or higher than 0° C., e.g., within the range of +2° C. to +5° C., which is set in view of a margin added to 0° C. as the freezing point of water. The warm-up start threshold temperature Ts corresponds to the "freezing determination temperature".

When the ambient temperature Ta is higher than the warm-up start threshold temperature Ts (Ta>Ts) (step S110: NO), the unit controller 23 determines that there is no possibility of freezing of the fuel cell 100 of each fuel cell unit 22, and finishes the control routine. On the other hand, when the ambient temperature Ta is equal to or lower than the warm-up start threshold temperature Ts (Ta≤Ts) (step S110: YES), the unit controller 23 determines that there is a possibility of freezing of the fuel cell 100 of each fuel cell unit 22, and sets an FC warm-up command flag to ON in step S120. When the FC warm-up command flag is ON, the fuel cell controller 500 of each fuel cell unit 22 activates the fuel cell cooling system 400 and starts warming the fuel cell 100, as will be described later.

Then, the unit controller 23 obtains the ambient temperature Ta in step S130, and determines whether there is a possibility of freezing of the fuel cell 100 of each fuel cell unit 22, from the relationship between the ambient temperature Ta and a warm-up end threshold temperature Te. The warm-up end threshold temperature Te is set to a temperature that is higher than the warm-up start threshold temperature Ts, so that FC warm-up (warming of the fuel cells) is carried out with stability. However, the warm-up end threshold temperature Te may be equal to the warm-up start threshold temperature Ts (Te=Ts).

When the ambient temperature Ta is lower than the warm-up end threshold temperature Te (Ta<Te) (step S130; NO), the unit controller 23 determines that the possibility of freezing of the fuel cell 100 of each fuel cell unit 22 has not been eliminated, and repeats step S130. On the other hand, when the ambient temperature Ta is equal to or higher than the warm-up end threshold temperature Te (Ta≥Te) (step S130: YES), the unit controller 23 determines that the possibility of freezing of the fuel cell 100 of each fuel cell unit 22 has been eliminated, sets the FC warm-up command flag to OFF in step S140, and finishes the control routine. When the FC warm-up command flag is OFF, the fuel cell controller 500 of each fuel cell unit 22 stops the fuel cell cooling system 400 and finishes warm-up of the fuel cell 100, as will be described later.

The unit controller 23 repeatedly executes the above control routine. The repeated execution of the control routine may be performed immediately after the end of the previous cycle of the control routine, or may be performed after the elapse of a certain period of time.

Figure 3:
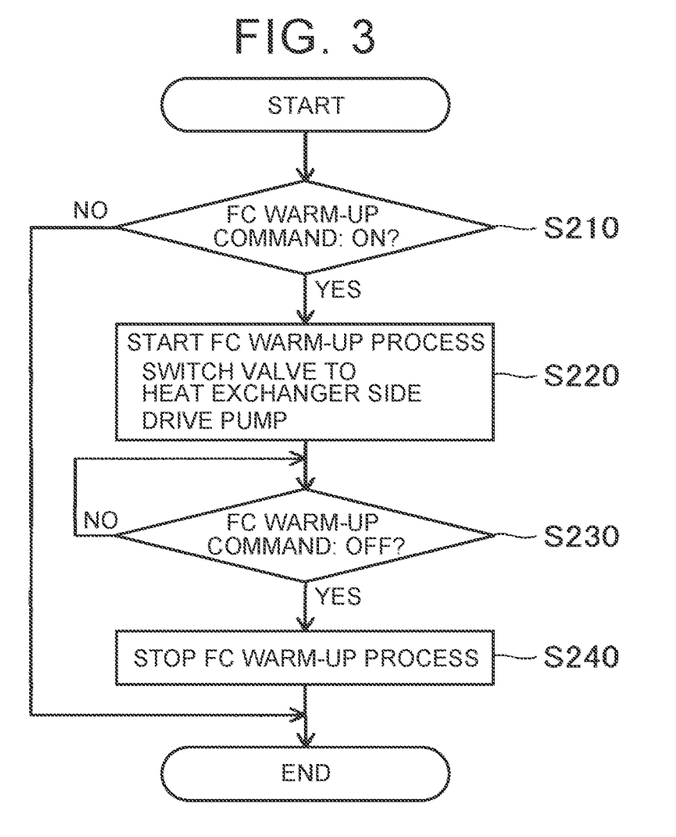
FIG. 3 is a control flowchart of a fuel cell controller of each fuel cell unit in an operation stopped state of the fuel cell system.

FIG. 3 is a control flowchart of the fuel cell controller 500 of each fuel cell unit 22 in the operation stopped state of the fuel cell system. When the fuel cell system is in the operation stopped state, the fuel cell controller 500 is activated according to a predetermined time schedule, to execute this control routine.

In step S210, the fuel cell controller 500 obtains the FC warm-up command flag from the unit controller 23, and determines whether an FC warm-up process is required, from the state of the FC warm-up command flag. When the FC warm-up command flag is OFF (step S210: NO), the fuel cell controller 500 determines that the FC warm-up process is not required, and finishes the control routine. On the other hand, when the FC warm-up command flag is ON (step S210: YES), the fuel cell controller 500 determines that the FC warm-up process is required, and activates only the fuel cell cooling system 400, to start the FC warm-up process, in step S220. More specifically, the fuel cell controller 500 switches the direction of flow of the flow dividing valve 460 to that of flow toward the heat exchanger 410, and drives the coolant pump 450, so that the secondary-side coolant is supplied by circulation to the fuel cell 100. The warm-up of the fuel cell 100 thus performed will be described later.

Then, in step S230, the fuel cell controller 500 obtains the FC warm-up command flag from the unit controller 23, and determines whether the FC warm-up process needs to be continued, from the state of the FC warm-up command flag.

When the FC warm-up command flag is not OFF (step S230: NO), the fuel cell controller 500 determines that the FC warm-up process needs to be continued, and repeats step S230. On the other hand, when the FC warm-up command flag is OFF (step S230: YES), the fuel cell controller 500 determines that the FC warm-up process does not need to be continued, and stops operating the fuel cell cooling system 400 in step S240, more specifically, stops driving the coolant pump 450 to stop the FC warm-up process. Then, the fuel cell controller 500 finishes this control routine.

Figure 4:
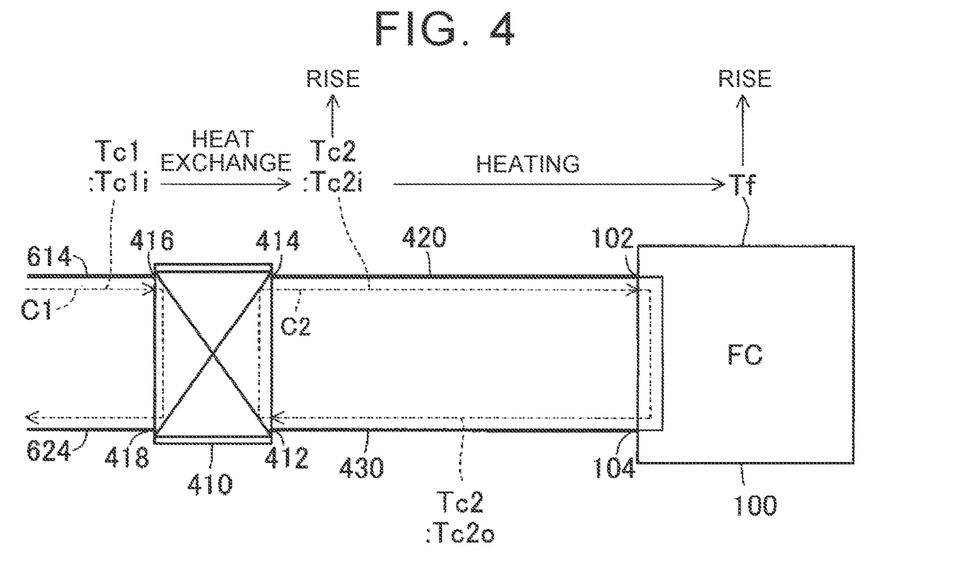
FIG. 4 is an explanatory view showing a state of a fuel cell cooling system during execution of an FC warm-up process.

FIG. 4 shows an operating state of the fuel cell cooling system 400 during execution of the FC warm-up process. In FIG. 4, only the heat exchanger 410, fuel cell 100, primary-side coolant supply line 614, primary-side coolant reflux line 624, coolant supply line 420, and coolant reflux line 430 are illustrated, for the sake of description, and other constituent elements (see FIG. 1) are not illustrated.

The primary-side coolant C1 circulates between the primary side of the heat exchanger 410 and the cooling device 30 (see FIG. 1), via the cooling system 40 (see FIG. 1) including the primary-side coolant supply line 614 and the primary-side coolant reflux line 624. Also, the secondary-side coolant C2 circulates between the secondary side of the heat exchanger 410 and the fuel cell 100, via the coolant supply line 420 and the coolant reflux line 430.

As described above, the temperature Tc1 of the primary-side coolant C1 in the operation stopped state of the fuel cell system 10 is controlled to a given temperature at which the coolant C1 does not freeze. In FIG. 4, Tc1$i$ denotes the temperature Tc1 of the primary-side coolant C1 that flows into the heat exchanger 410 via the primary-side inlet 416. In the following description, it is assumed that the temperature Tc1$i$ of the primary-side coolant is set to a temperature that is higher than the warm-up start threshold temperature Ts and the warm-up end threshold temperature Te.

In the following description, it is also assumed that the temperature Tc2 of the secondary-side coolant C2 is lower than the warm-up start threshold temperature Ts and the warm-up end threshold temperature Te. For simplicity in description, Tc2$i$ denotes the temperature Tc2 of the secondary-side coolant C2 that flows out of the heat exchanger 410 via the secondary-side outlet 414 and flows into the fuel cell 100 via the coolant inlet 102, with the temperature gradient in each line ignored. Also, Tc2$o$ denotes the temperature Tc2 of the secondary-side coolant C2 that flows out of the fuel cell 100 via the coolant outlet 104 and flows into the heat exchanger 410 via the secondary-side inlet 412.

At the start point of the FC warm-up process, the temperature Tc1$i$ of the primary-side coolant C1 flowing into the heat exchanger 410 is higher than the temperature Tc2$o$ of the secondary-side coolant C2 flowing into the heat exchanger 410. As described above, the heat exchanger 410 performs heat exchange between the primary-side coolant C1 that flows through the primary side, and the secondary-side coolant C2 that flows through the secondary side. Thus, the heat exchanger 410 transfers heat from the primary-side coolant C1 flowing through the primary side to the secondary-side coolant C2 flowing through the secondary side, so that the temperature Tc2$i$ of the secondary-side coolant C2 flowing from the heat exchanger 410 into the fuel cell 100 can be raised to a level higher than the temperature Tc2$o$ of the secondary-side coolant C2 flowing from the fuel cell 100 into the heat exchanger 410. With the secondary-side coolant C2 warmed by the heat exchanger 410 flowing through the fuel cell 100, a part of the heat is transferred from the secondary-side coolant C2 to the fuel cell 100, so as to raise the temperature Tf of the fuel cell 100. The secondary-side coolant C2 having the temperature Tc2$o$ that has been reduced by the amount utilized for the rise of the temperature Tf of the fuel cell 100 flows out of the fuel cell 100, and returns to the heat exchanger 410, to be warmed by the heat exchanger 410. In this manner, through circulation of the secondary-side coolant C2 warmed by the heat exchanger 410, the temperature of the secondary-side coolant C2 can be raised to be close to the temperature Tc1$i$ of the primary-side coolant C1. Thus, the temperature Tf of the fuel cell 100 can be raised to be close to the temperature Tc1$i$ of the primary-side coolant C1. As a result, it is possible to warm the fuel cell 100, so as to melt the fuel cell 100 that is frozen, or prevent the fuel cell 100 having a possibility of freezing from freezing.

In the fuel cell system 10 of the first embodiment, when the system is in the operation stopped state, only the fuel cell cooling system 400 of each fuel cell unit 22 is activated, in the case where the ambient temperature Ta in the container 21 is equal to or lower than the warm-up start threshold temperature Ts, which indicates a possibility of freezing of any of the fuel cells 100. Then, in the fuel cell cooling system 400, the secondary-side coolant is caused to flow through the heat exchanger 410, so that the secondary-side coolant can be warmed by receiving heat of the primary-side coolant of which the temperature is controlled in advance to a temperature at which it is not frozen. Thus, in each of the fuel cell units 22, the warmed secondary-side coolant is caused to flow through the fuel cell 100, thereby to warm the fuel cell 100, thus making it possible to curb freezing of the fuel cell 100. As a result, when operation of the fuel cell system 10 is started, the length of time of warm-up operation performed in each fuel cell unit 22 that has started operating can be shortened, and power generation can be promptly started in an appropriate operating state. In this connection, the unit controller 23 and each fuel cell controller 500 correspond to the "controller".

The temperature sensor 24 that measures the ambient temperature in the container 21 may be installed as described below. As described above, whether there is a possibility of freezing of the fuel cells 100 is determined, based on the ambient temperature of the container 21. Thus, the temperature sensor 24 that measures the ambient temperature is preferably installed at a position where the ambient temperatures of the fuel cells 100 of the fuel cell units 22 can be measured. However, the ambient temperatures of the fuel cells 100 are highly likely to change depending on the positions at which the respective fuel cells 100 are installed, in the container 21. Thus, one of the fuel cells 100 having the lowest ambient temperature may be determined in advance, and the temperature sensor 24 may be installed close to the fuel cell 100 thus determined. Also, where the temperature sensor 24 is installed close to any one of the fuel cells 100, a temperature difference from the ambient temperature of the fuel cell 100 of which the ambient temperature is reduced to the lowest level is obtained in advance, and the warm-up start threshold temperature Ts and the warm-up end threshold temperature Te may be set in view of the temperature difference.

B. Second Embodiment

Figure 5:
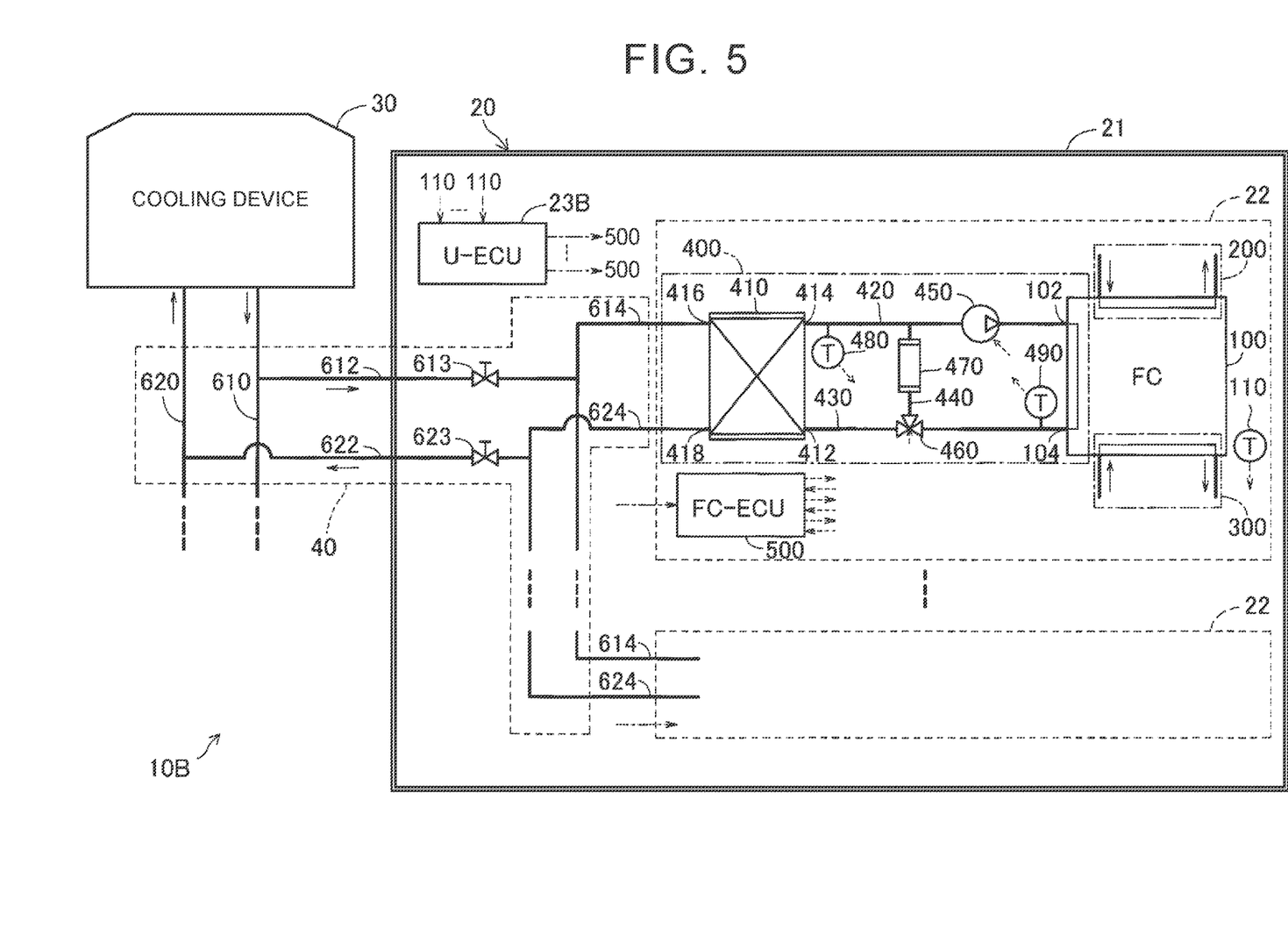
FIG. 5 is an explanatory view schematically showing the configuration of a fuel cell system as a second embodiment.

FIG. 5 schematically shows the configuration of a fuel cell system 10B as a second embodiment. The fuel cell system 10B includes a temperature sensor 110 installed in the vicinity of each fuel cell 100, in place of the temperature sensor 24 (see FIG. 1). Also, the fuel cell system 10B includes a unit controller 23B that controls each fuel cell controller 500, using measurement values received from each temperature sensor 110, as described later, in place of the unit controller 23 (see FIG. 1). The fuel cell system 10B has substantially the same configuration as the fuel cell system 10 (see FIG. 1) of the first embodiment, except for these differences.

Figure 6:
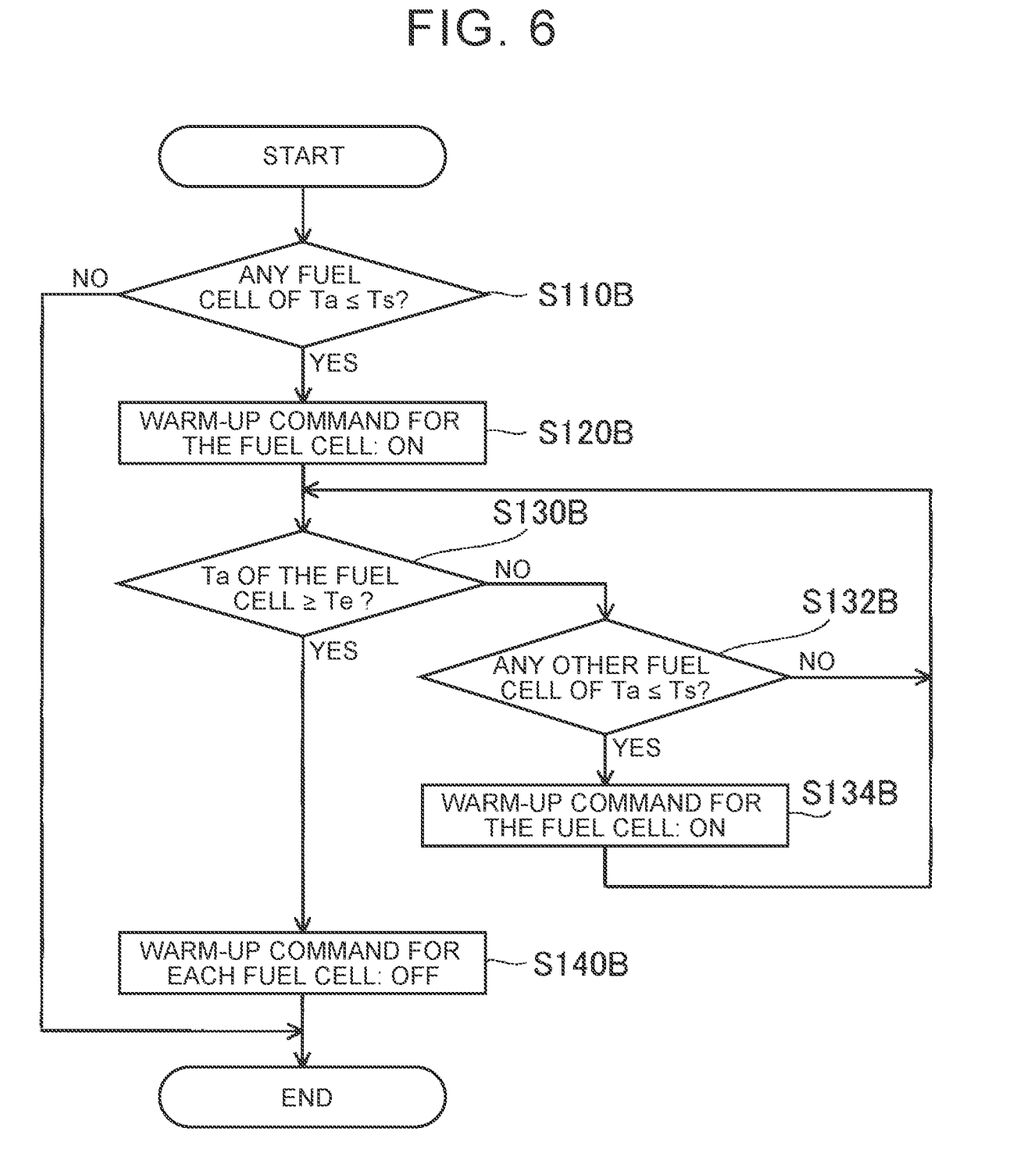
FIG. 6 is a control flowchart of a unit controller in an operation stopped state of the fuel cell system.

FIG. 6 is a control flowchart of the unit controller 23B in the operation stopped state of the fuel cell system. In step S110B, the unit controller 23B obtains the ambient temperature Ta of each fuel cell 100 from each temperature sensor 110, and determines the presence or absence of the possibility of freezing, with respect to each fuel cell 100, from the relationship between the ambient temperature Ta and the warm-up start threshold temperature Ts.

When the ambient temperatures Ta of all of the fuel cells 100 are higher than the warm-up start threshold temperature Ts (Ta>Ts) (step S110B: NO), the unit controller 23B determines that there is no possibility of freezing of any fuel cell 100, and finishes this control routine. On the other hand, when there is any fuel cell 100 of which the ambient temperature Ta is equal to or lower than the warm-up start threshold temperature Ts (Ta≤Ts) (step S110B: YES), the unit controller 23B determines that there is a possibility of freezing of the fuel cell 100 concerned, and sets the FC warm-up command flag of the fuel cell 100 concerned to ON in step S120B. The fuel cell controller 500 of the fuel cell unit 22 having the fuel cell 100 of which the FC warm-up command flag has been set to ON activates the fuel cell cooling system 400 and starts warming the fuel cell 100, in the manner as described above in the first embodiment (see FIG. 3).

Then, in step S130B, the unit controller 23B obtains the ambient temperature Ta of each fuel cell 100, and determines whether there is a possibility of freezing, with respect to each fuel cell 100, from the relationship between the ambient temperature Ta of each fuel cell 100 of which the FC warm-up command flag is ON, and the warm-up end threshold temperature Te.

When the ambient temperature Ta is lower than the warm-up end threshold temperature Te (Ta<Te) with respect to all of the fuel cells 100 (step S130B: NO), the unit controller 23B determines that the possibility of freezing has not been eliminated with respect to all of the fuel cells 100, and determines in step S132B whether there is any fuel cell 100 where the ambient temperature Ta is equal to or lower than the warm-up start threshold temperature (Ta≤Ts), out of the other fuel cells 100 of which the FC warm-up command flags are OFF.

When the ambient temperature Ta is higher than the warm-up start threshold temperature Ts (Ta>Ts) with respect to all of the other fuel cells 100 (step S132B: NO), the unit controller 23B returns to step S130B. On the other hand, when the ambient temperature Ta of any of the other fuel cells 100 is equal to or lower than the warm-up start threshold temperature Ts (Ta≤Ts) (step S132B: YES), the unit controller 23B determines that there is a possibility of freezing of the fuel cell 100 concerned, sets the FC warm-up command flag of the fuel cell 100 concerned to ON in step S134B, and returns to step S130B.

When the ambient temperatures Ta of all of the fuel cells 100 are equal to or higher than the warm-up end threshold temperature Te (Ta≥Te) (step S130B: YES), the unit controller 23B determines that the possibility of freezing of each fuel cell 100 has been eliminated, and sets each FC warm-up command flag to OFF in step S140B. Then, the control routine of FIG. 6 ends. When the FC warm-up command flag is set to OFF, the fuel cell controller 500 of each fuel cell unit 22 stops the fuel cell cooling system 400, and finishes warm-up of the fuel cell 100, as described above in the first embodiment.

The unit controller 23B repeatedly executes the above control routine. This control routine may be repeatedly performed immediately after the end of the previous cycle of the control routine, or may be repeatedly performed after the elapse of a certain period of time.

In the fuel cell system 10B of the second embodiment, the temperature sensor 110 is provided in the vicinity of each fuel cell 100, and only the fuel cell or cells 100 of which the ambient temperature Ta is equal to or lower than the warm-up start threshold temperature Ts is/are warmed up. Thus, the fuel cell(s) needed to be warmed up can be determined with higher accuracy, and freezing of the fuel cell(s) can be curbed with higher accuracy.

While only the fuel cell or cells 100 where the ambient temperature Ta is equal to or lower than the warm-up start threshold temperature Ts (Ta≤Ts) is/are warmed up in the second embodiment, it may be considered that, when there is a fuel cell 100 where Ta≤Ts, one or more fuel cells 100 around the fuel cell 100 concerned generally have a high possibility of freezing, and thus the fuel cell or cells 100 may also be warmed up. Also, all of the fuel cells 100 may be warmed up as in the first embodiment. While the FC warm-up command flags of all of the fuel cells 100 of which the flags are ON are collectively set to OFF (see step S140B in FIG. 6) in the second embodiment, the FC warm-up command flag may be individually set to OFF with respect to each fuel cell 100 of which the ambient temperature Ta becomes equal to or higher than the warm-up end threshold temperature Te (step S130B in FIG. 6).

C. Third Embodiment

Figure 7:
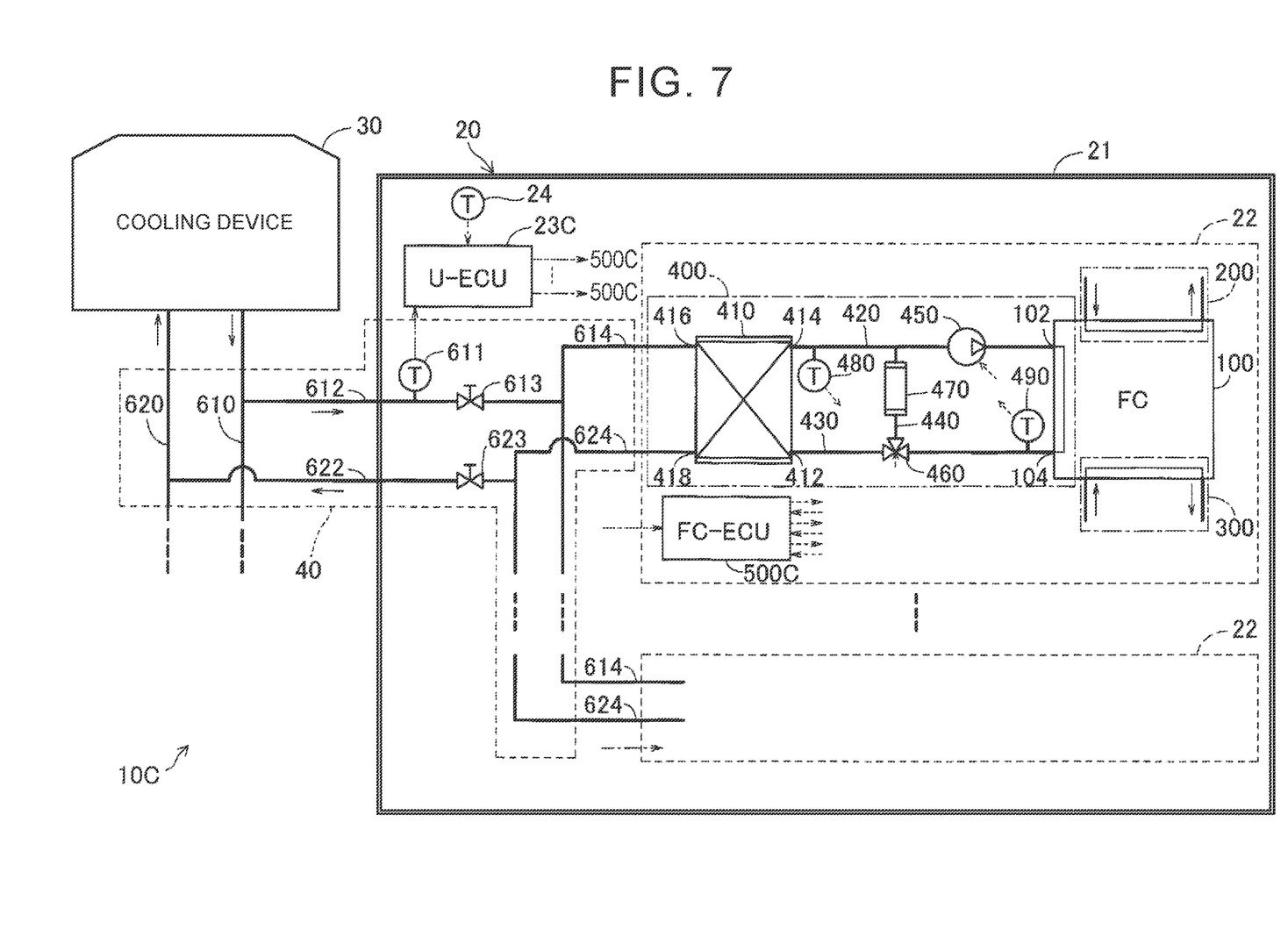
FIG. 7 is an explanatory view schematically showing the configuration of a fuel cell system as a third embodiment.

FIG. 7 schematically shows the configuration of a fuel cell system 10C as a third embodiment. The fuel cell system 10C includes a unit controller 23C in place of the unit controller 23 (see FIG. 1), and includes a temperature sensor 611 that measures the temperature of the primary-side coolant flowing through the facility supply line 612, and supplies measurement values to the unit controller 23C. Also, in the fuel cell system 10C, each fuel cell unit 22 includes a fuel cell controller 500C that controls the fuel cell cooling system 400, using the measurement values of the temperature sensor 611 supplied from the unit controller 23C, as described later, in place of the fuel cell controller 500 (see FIG. 1). The fuel cell system 10C has substantially the same configuration as the fuel cell system 10 (see FIG. 1) of the first embodiment, except for these differences. The fuel cell system 10C is characterized in that each fuel cell controller 500C executes a control routine as described below, in addition to the control routine (see FIG. 2) of the unit controller 23 and the control routine (see FIG. 3) of each fuel cell controller 500 in the operation stopped state of the fuel cell system as described above in the first embodiment.

Figure 8:
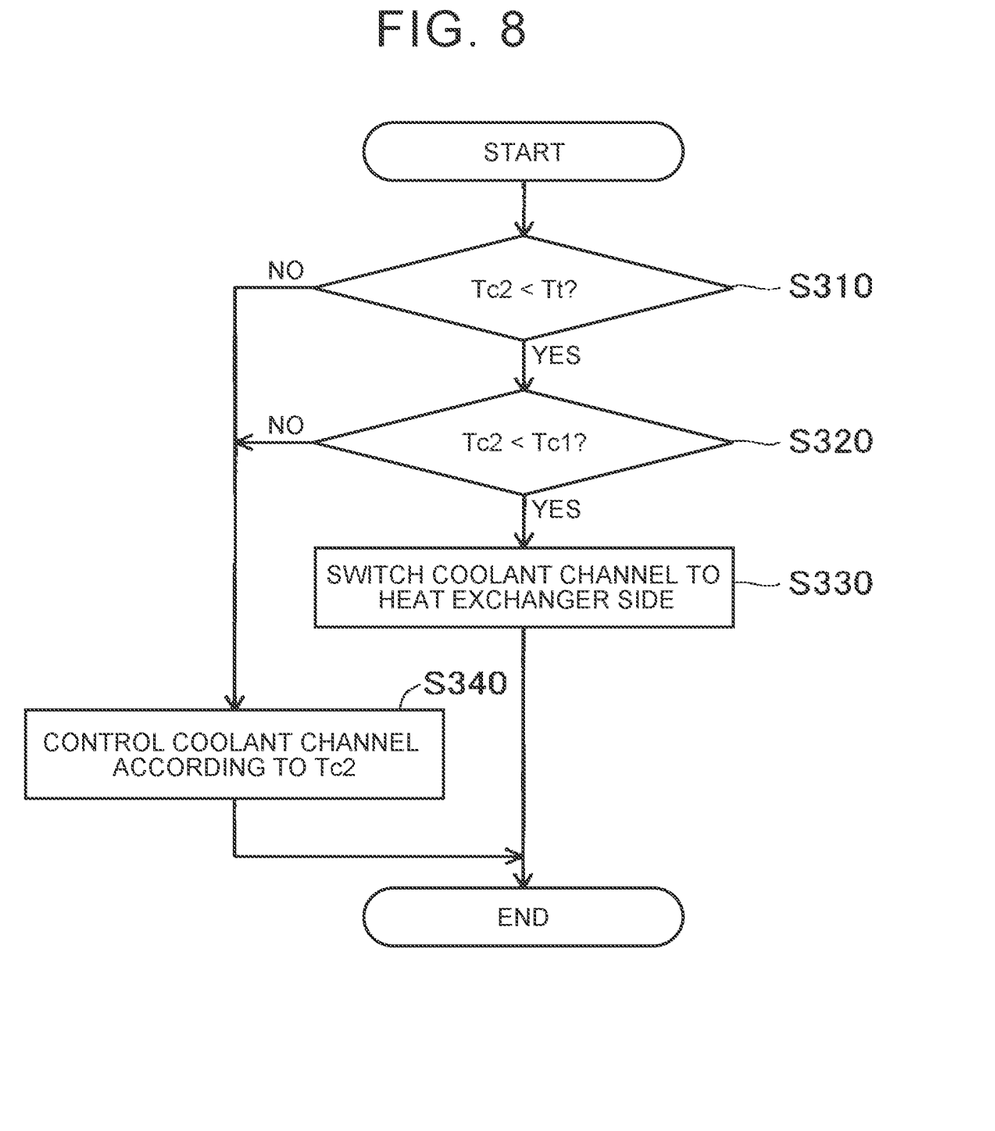
FIG. 8 is a control flowchart of a fuel cell controller of a fuel cell unit that has started operating during operation of the fuel cell system.

FIG. 8 is a control flowchart of the fuel cell controller 500C of the fuel cell unit 22 that starts operating during operation of the fuel cell system. The fuel cell controller 500C repeatedly executes the control routine, according to an operation command from the unit controller 23C, so as to control flow of the secondary-side coolant in the fuel cell cooling system 400. In this connection, the unit controller 23C arbitrarily sets the number of the fuel cell units that start operating, out of the fuel cell units 22, and arbitrarily specifies the fuel cell units that start operating, according to a schedule of power generation, for example.

In step S310, the fuel cell controller 500C obtains the temperature Tc2 of the secondary-side coolant from the temperature sensor 490 provided at the coolant outlet 104 of the fuel cell 100, as a temperature that can be used as the temperature Tf of the fuel cell 100, and determines the relationship between the temperature Tc2 of the secondary-side coolant and a target temperature Tt.

The target temperature Tt is set to a temperature at which power generation can be appropriately performed in the fuel cell 100. For example, the target temperature Tt is set to a temperature of about 40° C. to 60° C. As the temperature Tc2 of the secondary-side coolant, a measurement value of the temperature sensor 480 provided in an end portion of the coolant supply line 420 closer to the heat exchanger 410 may be obtained. The temperature of the secondary-side coolant measured by the temperature sensor 490 is the temperature of the secondary-side coolant that has flowed through the fuel cell 100, and the temperature of the secondary-side coolant measured by the temperature sensor 480 is the temperature of the secondary-side coolant that has not flowed through the fuel cell 100. Thus, these temperatures have a given correlation with each other according to the heat-generating state of the fuel cell 100. Accordingly, either of the temperatures can be used as a temperature indicating the temperature of the fuel cell 100. However, it is preferable to use the temperature of the secondary-side coolant that has flowed through the fuel cell 100, since the temperature of the secondary-side coolant that has flowed through the fuel cell 100 is closer to the actual temperature of the fuel cell 100. In this embodiment, the temperature of the secondary-side coolant that has flowed through the fuel cell 100, which is measured by the temperature sensor 490, is used as the temperature Tc2 of the secondary-side coolant.

When the temperature Tc2 is equal to or higher than the target temperature Tt (Tc2≥Tt) (step S310: NO), the fuel cell controller 500C determines that there is no need to warm the fuel cell 100, and controls a coolant channel through which the secondary-side coolant flows, according to the temperature Tc2 of the secondary-side coolant, in step S340. More specifically, the fuel cell controller 500C adjusts the opening of the flow dividing valve 460, to adjust the flow rate of the coolant flowing toward the heat exchanger 410 and the flow rate of the coolant flowing toward the bypass line 440, so that the temperature Tc2 of the secondary-side coolant is kept equal to or higher than the target temperature Tt, and is kept in a condition of a proper temperature suitable for power generation, and supplies the secondary-side coolant to the fuel cell 100 by circulation.

When the temperature Tc2 is lower than the target temperature (Tc2<Tt) (step S310: YES), the fuel cell controller 500C determines that there is a need to warm the fuel cell 100, and further determines the relationship between the temperature Tc2 of the secondary-side coolant and the temperature Tc1 of the primary-side coolant, in step S320. The temperature Tc1 of the primary-side coolant is obtained from the unit controller 23C.

When the temperature Tc2 of the secondary-side coolant is equal to or higher than the temperature Tc1 of the primary-side coolant (Tc2≥Tc1) (step S320: NO), the fuel cell controller 500C controls the coolant channel through which the secondary-side coolant flows, according to the temperature Tc2 of the secondary-side coolant, in step S340. However, unlike the case where Tc2≥Tt (step S310: NO), there is a need to keep warming the fuel cell 100 by warming the secondary-side coolant, since the temperature Tc2 of the secondary-side coolant is lower than the target temperature Tt (Tc2<Tt) (step S310: YES). Thus, in the range of Tc1≤Tc2<Tt, the flow direction of the flow dividing valve 460 is switched to the bypass line 440 side, so that the secondary-side coolant flows toward the bypass line 440, rather than toward the heat exchanger 410, and the secondary-side coolant is supplied by circulation to the fuel cell 100.

When the temperature Tc2 is lower than the temperature Tc1 (Tc2<Tc1) (step S320: YES), the fuel cell controller 500C switches the flow direction of the flow dividing valve 460 to the heat exchanger 410 side, so that the secondary-side coolant flows toward the heat exchanger 410, and supplies the secondary-side coolant to the fuel cell 100 by circulation. In this case, the secondary-side coolant is warmed by receiving heat from the primary-side coolant, so that the fuel cell 100 is warmed up, and the secondary-side coolant is also warmed through self-heating of the fuel cell 100, so that the fuel cell 100 is warmed up.

In the fuel cell system 10C of the third embodiment, in the fuel cell unit 22 that starts operating during operation of the fuel cell system, too, the fuel cell 100 can be warmed by warming the secondary-side coolant with heat received from the primary-side coolant, in addition to self-heating of the fuel cell 100. Thus, when operation of the fuel cell system 10C is started, the length of time for warm-up operation performed in the fuel cell unit 22 can be further shortened, and power generation can be started more quickly in an appropriate operating state.

The fuel cell system 10C of the third embodiment adopts the control routine (FIG. 8) of the fuel cell cooling system 400 in the operating state of the fuel cell system, based on the configuration of the fuel cell system 10 (see FIG. 1) of the first embodiment. However, the configuration of the fuel cell system 10C is not limited to this, but the fuel cell system 10C may adopt the control routine (FIG. 8) of the fuel cell cooling system 400 in the operating state of the fuel cell system, based on the configuration of the fuel cell system 10B (see FIG. 5) of the second embodiment.

D. Other Embodiments (D1) While the fuel cell cooling system 400 of the first embodiment and the second embodiment includes the bypass line 440 and the flow dividing valve 460, it may not include the bypass line 440 and the flow dividing valve 460. In this case, too, similar effects can be obtained.

(D2) In the first embodiment, control of the fuel cell controller 500 of each fuel cell unit 22 is performed, according to control of the unit controller 23. However, control of each fuel cell unit 22 performed by the unit controller 23 may be performed by each fuel cell controller 500. Similarly, in the second embodiment, too, individual control performed by the unit controller 23B on each fuel cell unit 22 may be performed by each fuel cell controller 500.

(D3) While the fuel cell system includes a single power generating facility 20 in each of the illustrated embodiments, it may include two or more power generating facilities. In this case, the control described above in each embodiment may be performed in each of the power generating facilities.

(D4) In the first embodiment, the ambient temperature measured by the temperature sensor 24 installed in any one of the fuel cell units 22 is used, as the temperature based on which the presence or absence of the possibility of freezing of the fuel cell or cells 100 is determined. Also, in the second embodiment, the ambient temperature measured by the temperature sensor 110 installed in the vicinity of the fuel cell 100, in each of the fuel cell units 22, is used as the temperature based on which the presence or absence of the possibility of freezing of the fuel cell 100 is determined. The temperature based on which the presence or absence of the possibility of freezing of the fuel cell 100 is determined is not limited to these ones, but may be any temperature provided that the presence or absence of the possibility of freezing of the fuel cell 100 can be determined based on the temperature. For example, the temperature of the secondary-side coolant flowing through the fuel cell 100, in particular, the temperature of the secondary-side coolant in the vicinity of the coolant outlet 104 of the fuel cell 100, may be used. Namely, any temperature having a given correlation with the temperature of the fuel cell 100 may be used. Also, any ambient temperature within the power generating facility 20 may be used. It is, however, preferable to use a temperature that is closer to the temperature of the fuel cell 100, for example, the ambient temperature at a position closer to the fuel cell 100, or the temperature of the secondary-side coolant in the vicinity of the coolant outlet of the fuel cell 100, as in the illustrated embodiments.

(D5) In the third embodiment, the temperature sensor 611 that measures the temperature of the primary-side coolant is provided in the facility supply line 612 for supplying the primary-side coolant into the power generating facility 20. However, the position of the temperature sensor 611 is not limited to this, but the temperature sensor 611 may be provided in the main supply line 610 in the vicinity of the cooling device 30. Where two or more power generating facilities 20 are provided, the temperature of the primary-side coolant can be measured with the single temperature sensor 611.

(D6) A part or the whole of the control routine executed by the unit controller 23 may be implemented by a hardware circuit. Similarly, a part or the whole of the control routine executed by the fuel cell controller 500 may be implemented by a hardware circuit.

This disclosure is not limited to the above embodiments, but may be practiced with various arrangements without departing from its principle. For example, the technical features of the embodiments corresponding to the technical features in the respective forms described in the SUMMARY can be replaced or combined as needed, so as to solve a part or the whole of the above problems, or achieve a part or the whole of the above effects. Also, when the technical features are not described as being essential in this specification, they may be deleted as needed.

What is claimed is:

1. A fuel cell system comprising:
    a plurality of fuel cell units each including a fuel cell, a fuel cell cooling system, and a controller that controls operation of the fuel cell, the fuel cell cooling system having a heat exchanger that performs heat exchange between a primary-side coolant supplied from an outside, and a secondary-side coolant that flows through the fuel cell, and a coolant pump that adjusts a flow rate of the secondary-side coolant;
    a cooling device; and
        a cooling system that supplies the primary-side coolant from the cooling device to each of the fuel cell units, wherein, during stop of operation of the fuel cell system, the cooling device is configured to adjust a temperature of the primary-side coolant to a level that is equal to or higher than a predetermined temperature, and supply the primary-side coolant to each of the fuel cell units, and the controller is configured to activate the coolant pump to cause the secondary-side coolant to flow through the heat exchanger, in at least one of the fuel cell units in which the fuel cell has a possibility of freezing, wherein:
    the fuel cell cooling system further has a valve operable to selectively cause the secondary-side coolant flowing from the fuel cell to flow through the heat exchanger or bypass the heat exchanger; and
    during stop of operation of the fuel cell system, the controller of each of the at least one of the fuel cell units in which the fuel cell has the possibility of freezing is configured to activate the coolant pump, and operate the valve to cause the secondary-side coolant to flow through the heat exchanger; and
    wherein, in each of at least one of the fuel cell units that starts operating during operation of the fuel cell system, while a temperature of the secondary-side coolant used as a temperature of the fuel cell is lower than a target temperature, the controller is configured to activate the coolant pump, and operate the valve to cause the secondary-side coolant to flow through the heat exchanger, when the temperature of the secondary-side coolant is lower than a temperature of the primary-side coolant, and the controller is configured to activate the coolant pump, and operate the valve to cause the secondary-side coolant to bypass the heat exchanger, when the temperature of the secondary-side coolant is equal to or higher than the temperature of the primary-side coolant.

2. The fuel cell system according to claim 1, further comprising a unit controller that controls the fuel cell units, wherein
    the unit controller is configured to determine that the fuel cell has the possibility of freezing when an ambient temperature of the fuel cell of which the possibility of freezing is to be determined is equal to or lower than a freezing determination temperature.

3. The fuel cell system according to claim 1, wherein the controller of each of the fuel cell units is configured to determine that the fuel cell has the possibility of freezing when an ambient temperature of the fuel cell of which the possibility of freezing is to be determined is equal to or lower than a freezing determination temperature.

4. A method of controlling a fuel cell system including a plurality of fuel cell units each including a fuel cell, and a fuel cell cooling system having a heat exchanger that performs heat exchange between a primary-side coolant supplied from an outside, and a secondary-side coolant that flows through the fuel cell, and a coolant pump that adjusts a flow rate of the secondary-side coolant, a cooling device, and a cooling system that supplies the primary-side coolant from the cooling device to each of the fuel cell units, the method comprising:
    determining at least one of the fuel cell units of which the fuel cell has a possibility of freezing, during stop of operation of the fuel cell system; and
    operating the coolant pump to cause the secondary-side coolant to flow through the heat exchanger, in the at least one of the fuel cell units, in a condition where the primary-side coolant having a temperature adjusted to a level equal to or higher than a predetermined temperature is supplied from the cooling device to each of the fuel cell units, wherein:
    the fuel cell cooling system further has a valve operable to selectively cause the secondary-side coolant flowing from the fuel cell to flow through the heat exchanger or bypass the heat exchanger; the method further comprising:
    during stop of operation of the fuel cell system, for each of the at least one of the fuel cell units in which the fuel cell has the possibility of freezing, activating the coolant pump, and operating the valve to cause the secondary-side coolant to flow through the heat exchanger; and wherein, in each of at least one of the fuel cell units that starts operating during operation of the fuel cell system, while a temperature of the secondary-side coolant used as a temperature of the fuel cell is lower than a target temperature, activating the coolant pump, and operating the valve to cause the secondary-side coolant to flow through the heat exchanger, when the temperature of the secondary-side coolant is lower than a temperature of the primary-side coolant, and activating the coolant pump, and operating the valve to cause the secondary-side coolant to bypass the heat exchanger, when the temperature of the secondary-side coolant is equal to or higher than the temperature of the primary-side coolant.

\* \* \* \* \*